(12) United States Patent
Moon et al.

(10) Patent No.: US 8,248,821 B2
(45) Date of Patent: Aug. 21, 2012

(54) FLAT PANEL DISPLAY DEVICE

(75) Inventors: Chan-Kyoung Moon, Yongin (KR);
Hyun-Cheul Kim, Yongin (KR);
Hyun-Hee Lee, Yongin (KR); Dong-Su Yee, Yongin (KR); Jung-Ho Hwang, Yongin (KR); Dai-Han Cho, Yongin (KR); Min-Su Kim, Yongin (KR);
Chan-Hee Wang, Yongin (KR)

(73) Assignee: Samsung Mobile Display Co., Ltd., Giheung-Gu, Yongin, Gyunggi-Do (KR)

( * ) Notice: Subject to any disclaimer, the term of this patent is extended or adjusted under 35 U.S.C. 154(b) by 345 days.

(21) Appl. No.: 12/632,926

(22) Filed: Dec. 8, 2009

(65) Prior Publication Data
US 2010/0142172 A1 Jun. 10, 2010

(30) Foreign Application Priority Data
Dec. 8, 2008 (KR) ........................ 10-2008-0124194

(51) Int. Cl.
*H05K 7/02* (2006.01)
*H05K 7/04* (2006.01)
(52) U.S. Cl. ...................................... 361/809
(58) Field of Classification Search ............ 361/679.34, 361/679.21, 679.22, 681, 683, 685, 807, 361/809, 810; 40/768
See application file for complete search history.

(56) References Cited

U.S. PATENT DOCUMENTS

| | | | |
|---|---|---|---|
| 5,633,660 A * | 5/1997 | Hansen et al. ................. | 345/173 |
| 5,774,107 A * | 6/1998 | Inou .............................. | 345/104 |
| 6,477,039 B2 * | 11/2002 | Tajima ...................... | 361/679.21 |
| 6,504,713 B1 * | 1/2003 | Pandolfi et al. ............... | 361/695 |
| 6,532,152 B1 * | 3/2003 | White et al. ................... | 361/692 |
| 7,164,586 B2 * | 1/2007 | Lin ............................... | 361/714 |
| 7,586,624 B2 * | 9/2009 | Kim .............................. | 356/614 |
| 2004/0090567 A1 * | 5/2004 | Lee et al. ......................... | 349/58 |
| 2004/0246397 A1 * | 12/2004 | Kang et al. ....................... | 349/58 |
| 2005/0088809 A1 * | 4/2005 | Nakagawa et al. ........... | 361/681 |
| 2005/0110918 A1 * | 5/2005 | Izawa ............................... | 349/58 |
| 2006/0171107 A1 * | 8/2006 | Yamamoto et al. ........... | 361/683 |
| 2006/0254107 A1 * | 11/2006 | Watanabe ....................... | 40/768 |
| 2007/0154211 A1 * | 7/2007 | Kim ................................. | 398/9 |
| 2009/0040192 A1 * | 2/2009 | Haga ............................ | 345/174 |
| 2009/0122476 A1 * | 5/2009 | Won et al. ................. | 361/679.21 |
| 2009/0213534 A1 * | 8/2009 | Sakai ........................ | 361/679.21 |
| 2011/0018823 A1 * | 1/2011 | Moon ............................ | 345/173 |

FOREIGN PATENT DOCUMENTS

| KR | 10-2007-0111128 | 11/2007 |
|---|---|---|
| KR | 10-2008-0043414 | 5/2008 |

* cited by examiner

*Primary Examiner* — Lisa Lea Edmonds
*Assistant Examiner* — Xanthia C Cunningham
(74) *Attorney, Agent, or Firm* — Robert E. Bushnell, Esq.

(57) ABSTRACT

A flat panel display device having improved drop characteristics, that minimize a drop shock of the flat panel display device by controlling the size of a shock-absorbing tape, the flat panel display device including: a display panel having a display part to display an image and a pad part; a supporting member configured to support the display panel; and the shock-absorbing tape disposed between the display panel and the supporting member. The shock-absorbing tape is in contact with the display part of the display panel and ⅓ to ⅚ of the pad part of the display panel.

20 Claims, 7 Drawing Sheets

FLAT PANEL DISPLAY DEVICE

CROSS-REFERENCE TO RELATED APPLICATION

This application claims the benefit of Korean Patent Application No. 2008-124194, filed in the Korean Intellectual Property Office on Dec. 8, 2008, the disclosure of which is incorporated herein by reference.

BACKGROUND OF THE INVENTION

1. Field of the Invention

Aspects of the present invention relate to a flat panel display device to improve drop characteristics, and more particularly, to a flat panel display device in which the size of a shock-absorbing tape disposed between a display panel and a supporting member is controlled to thereby minimize a drop shock of the flat panel display device.

2. Description of the Related Art

Flat panel display devices have been used as substitutes for cathode-ray tube display devices due to various advantages, including their light weight and thinness. Such flat panel displays include liquid crystal display (LCD) devices and organic light emitting diode (OLED) display devices. Among them, compared to LCD devices, OLED display devices have excellent brightness and wide viewing angle characteristics. Furthermore, OLED display devices do not need a back light unit, and can thus be formed with a very slim design.

The flat panel display device is generally formed by locating a light emitting element (such as a light emitting diode) or liquid crystal between a first substrate and a second substrate having a smaller area than the first substrate, and attaching the first substrate to the second substrate along an edge of the second substrate. A region in which the first substrate and the second substrate overlap becomes a display part for displaying a certain image in response to an image signal. In contrast, a region along the first substrate in which the second substrate does not overlap the first substrate becomes a pad part electrically connected to an external part to provide an image signal to the display part.

The flat panel display device may include a supporting member open at one side that prevents damage to the display part and the pad part due to external shock (for example, resulting from a drop of the flat panel display device). Moreover, the supporting member accommodates the display panel for easy installation in an electric/electronic device. The flat panel display device may further include a shock-absorbing tape disposed between the display panel and the supporting member to reduce transfer of a shock (e.g., drop) applied to the supporting member. In other words, the shock-absorbing tape improves drop characteristics of the flat panel display device.

Conventionally, the shock-absorbing tape of the flat panel display device is smaller than the display part in consideration of assembly tolerance. However, since the drop characteristics of the flat panel display device vary according to the size of the shock-absorbing tape, a shock transferred to the display panel when the flat panel display device is dropped also varies according to the size of the shock-absorbing tape.

SUMMARY OF THE INVENTION

Aspects of the present invention provide a flat panel display device in which a size of a shock-absorbing tape disposed between a display panel and a supporting member of the flat panel display device is controlled to optimize drop characteristics of the flat panel display device, resulting in minimizing the stress applied to the display panel when an external shock is applied (for example, when the flat panel display device is dropped).

According to an aspect of the present invention, there is provided a flat panel display device including: a display panel having a display part to display an image and a pad part that does not display an image; a supporting member to support the display panel; and a shock-absorbing tape disposed between the display panel and the supporting member, the shock-absorbing tape being in contact with the display part and ⅓ to ⅚ of the pad part of the display panel.

According to another aspect of the present invention, there is provided a flat panel display device, including: a display panel having a display part to display an image and a pad part that does not display the image; a supporting member to support the display panel; a touch panel to receive an input signal; and a shock-absorbing tape disposed between the display panel and the supporting member, the shock-absorbing tape being in contact with all of the display part of the display panel and up to ⅚ of the pad part of the display panel.

According to yet another aspect of the present invention, there is provided a flat panel display device, including: a display panel having a display part to display an image and a pad part that does not display the image; a supporting member to support the display panel; and a shock-absorbing tape disposed between the display panel and the supporting member, the shock-absorbing tape being in contact with at least all of the display part of the display panel.

According to still another aspect of the present invention, there is provided a method of controlling a pressure shock of a flat panel display device including a display panel having a display part to display an image and a pad part that does not display the image, the method including: optimizing a size of a shock-absorbing tape to be in contact with all of the display part of the display panel and none of or a portion of the pad part according to characteristics of the flat panel display device; and providing the shock-absorbing tape between the display panel and a supporting member of the flat panel display device.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION OF THE EMBODIMENTS

Reference will now be made in detail to the embodiments of the present invention, examples of which are illustrated in the accompanying drawings, wherein like reference numerals refer to like elements throughout. The embodiments are described below, in order to explain the present invention by referring to the figures.

Figure 1:
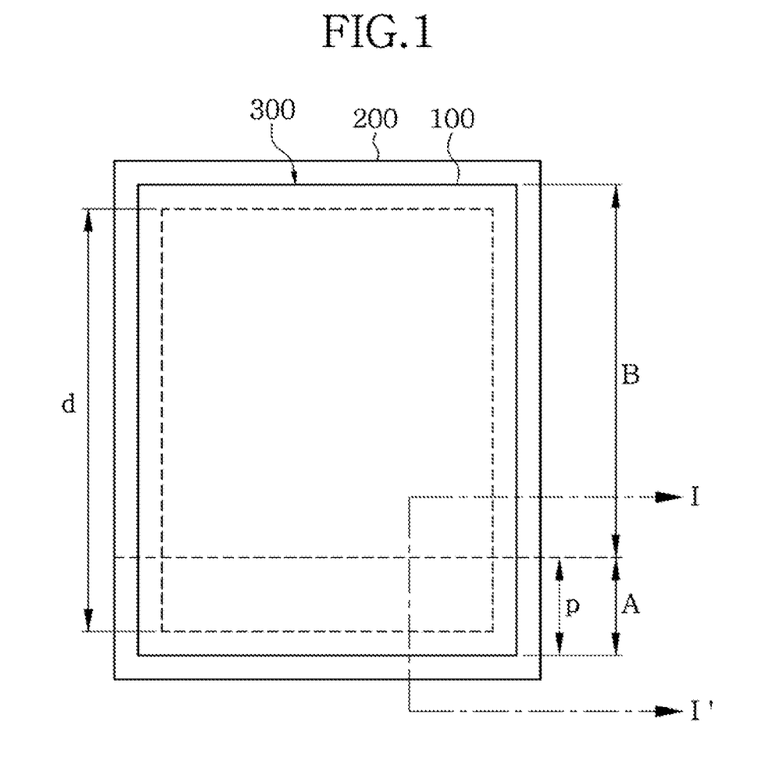
FIG. 1 is a plan view of a flat panel display device according to an embodiment of the present invention.
Figure 2:
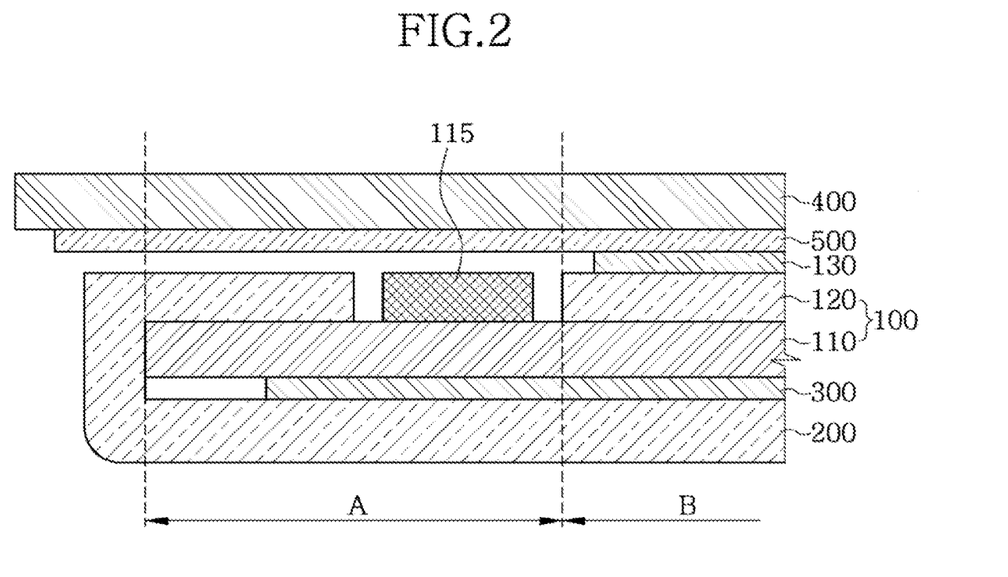
FIG. 2 is a cross-sectional view taken along line I-I' of FIG. 1.

FIG. 1 is a plan view of a flat panel display device according to an embodiment of the present invention, and FIG. 2 is a cross-sectional view taken along line I-I' of FIG. 1. Referring to FIGS. 1 and 2, the flat panel display device includes a display panel 100, a supporting member 200 configured to support the display panel 100, and a shock-absorbing tape 300 disposed between the display panel 100 and the supporting member 200.

The display panel 100 is formed by attaching a first substrate 110 to a second substrate 120 having a smaller area than the first substrate 110. Here, a region of the display panel 100 in which the first substrate 110 and the second substrate 120 overlap corresponds to a display part B configured to display a certain image in response to an image signal. Conversely, a region of the display panel 100 in which the second substrate 120 does not overlap the first substrate 110 corresponds to a pad part A electrically connected to an external part to provide an image signal to the display part B. Here, in the pad part A, a driving driver 115 is provided to convert an image signal received from an external part via a flexible printed circuit (FPC; not shown) into an image signal easily displayed by the display part B. However, it is understood that according to other aspects, the driving driver 115 may be provided elsewhere.

The supporting member 200 is open at one side to externally show an image displayed by the display part B of the display panel 100. Furthermore, the supporting member 200 fixes the display panel 100 to protect the display panel 100 from an external shock and to facilitate connection to an external device. As shown in FIG. 2, the supporting member 200 may be open to the second substrate 120 of the display panel 100 to facilitate connection of the pad part A of the display panel 100 with the FPC. Here, the supporting member 200 may be formed of a metal or a synthetic resin to prevent damage of the display panel 100 due to an external shock. It is understood that aspects of the present invention are not limited thereto. That is, the supporting member 200 may be formed in any structure or of any material that can fix and protect the display panel 100.

To improve brightness and contrast of a displayed image, the flat panel display device includes a polarizer 130, disposed at one side of the display part B of the display panel 100 on the open side of the supporting member 200, a touch panel 400 to receive a selected signal by pressure, and an ESP tape 500 disposed between the touch panel 400 and the polarizer 130 or display panel 100. However, it is understood that according to other aspects, the flat panel display device may include none or less than all of the polarizer 130, the touch panel 400, and the ESP tape 500.

The shock-absorbing tape 300 may be formed of rubber or synthetic resin capable of absorbing a shock transferred to the display panel 100 (for example, from a drop) to reduce the shock, that is applied to the supporting member 200, or may be an insulating tape on both surfaces of which an adhesive is applied (such as a double-sided tape).

Figure 3:
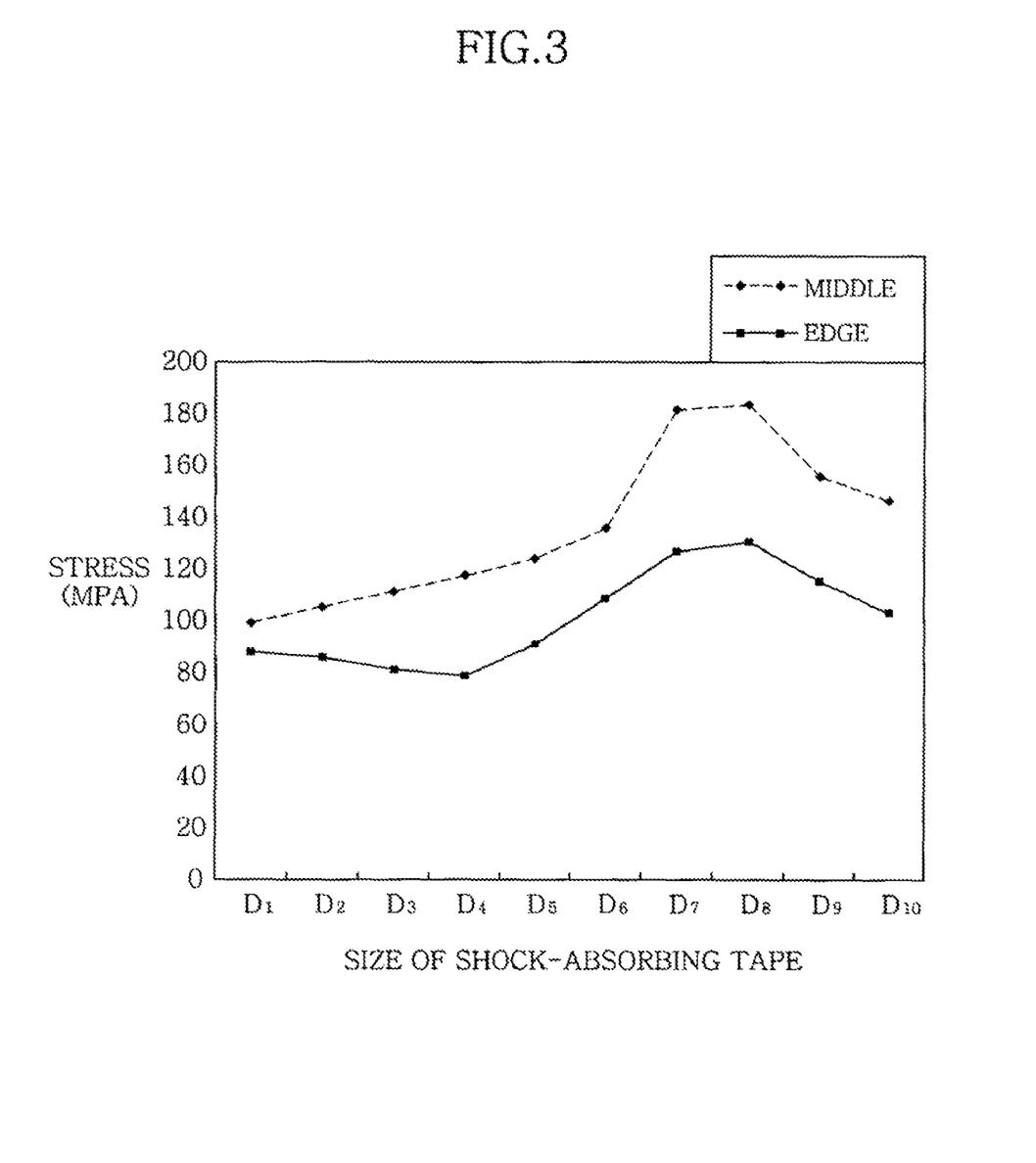
FIG. 3 is a graph showing stresses in the middle and at an edge of a display panel according to a size of a shock-absorbing tape measured on an upper surface of a first substrate of the display panel.
Figure 4:
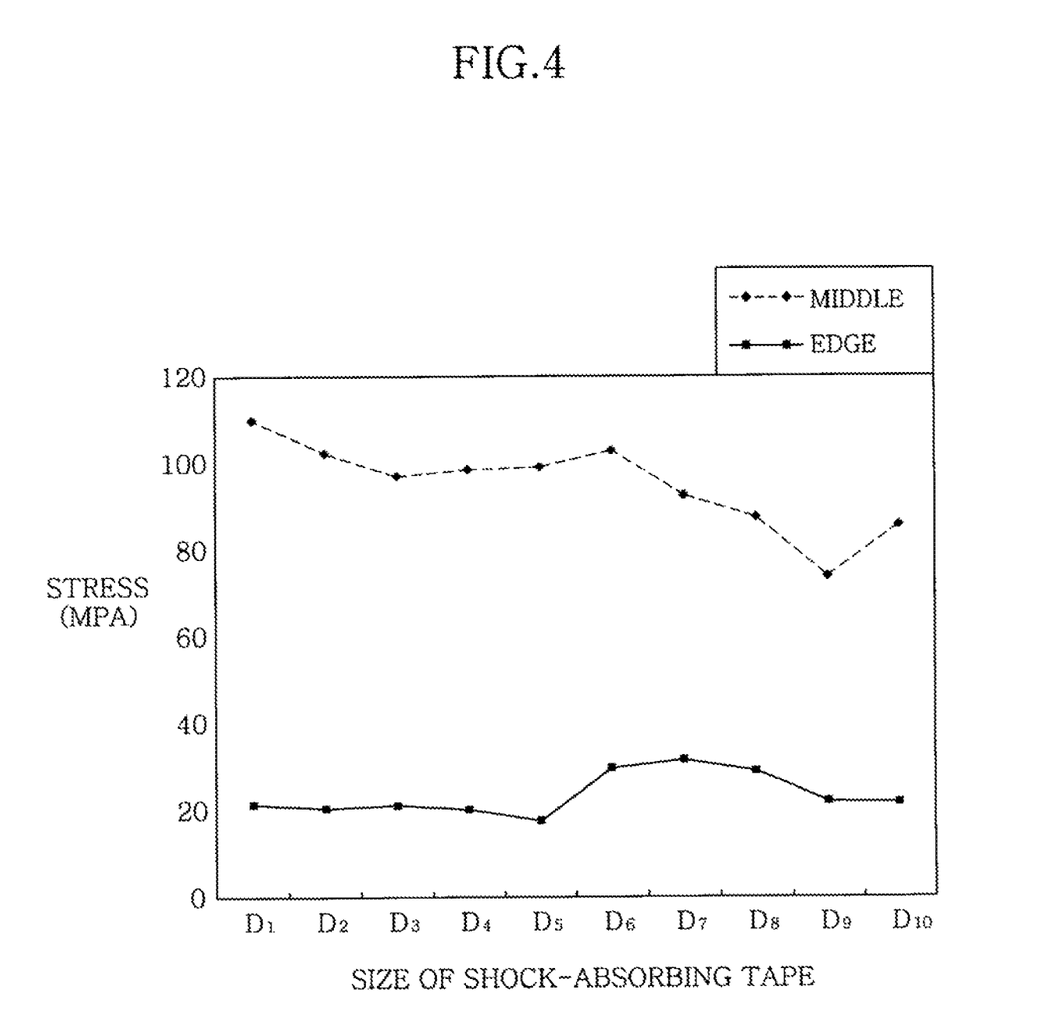
FIG. 4 is a graph showing stresses in the middle and at the edge of the display panel according to a size of a shock-absorbing tape measured on a lower surface of the first substrate of the display panel.
Figure 5:
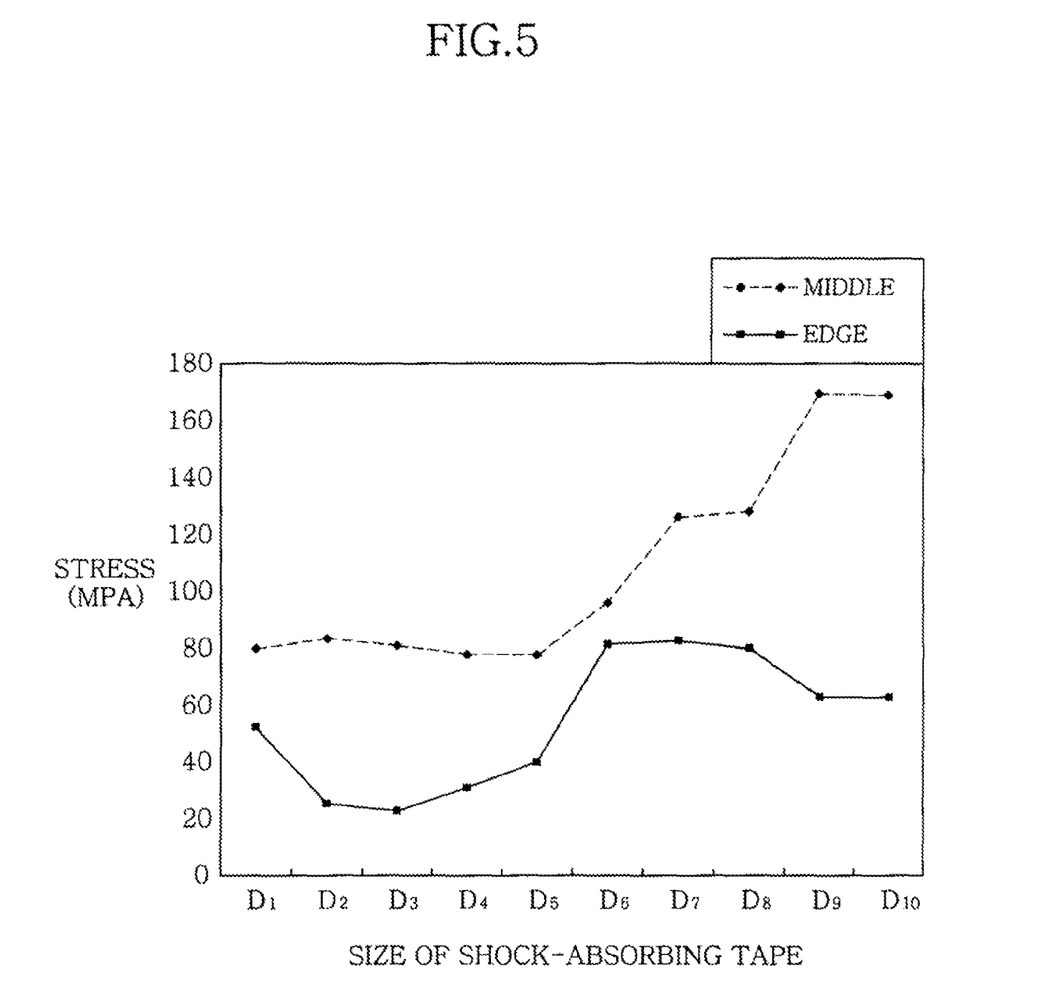
FIG. 5 is a graph showing stresses in a middle of and at an edge of the display panel according to a size of a shock-absorbing tape measured on an upper surface of a second substrate of the display panel.
Figure 6:
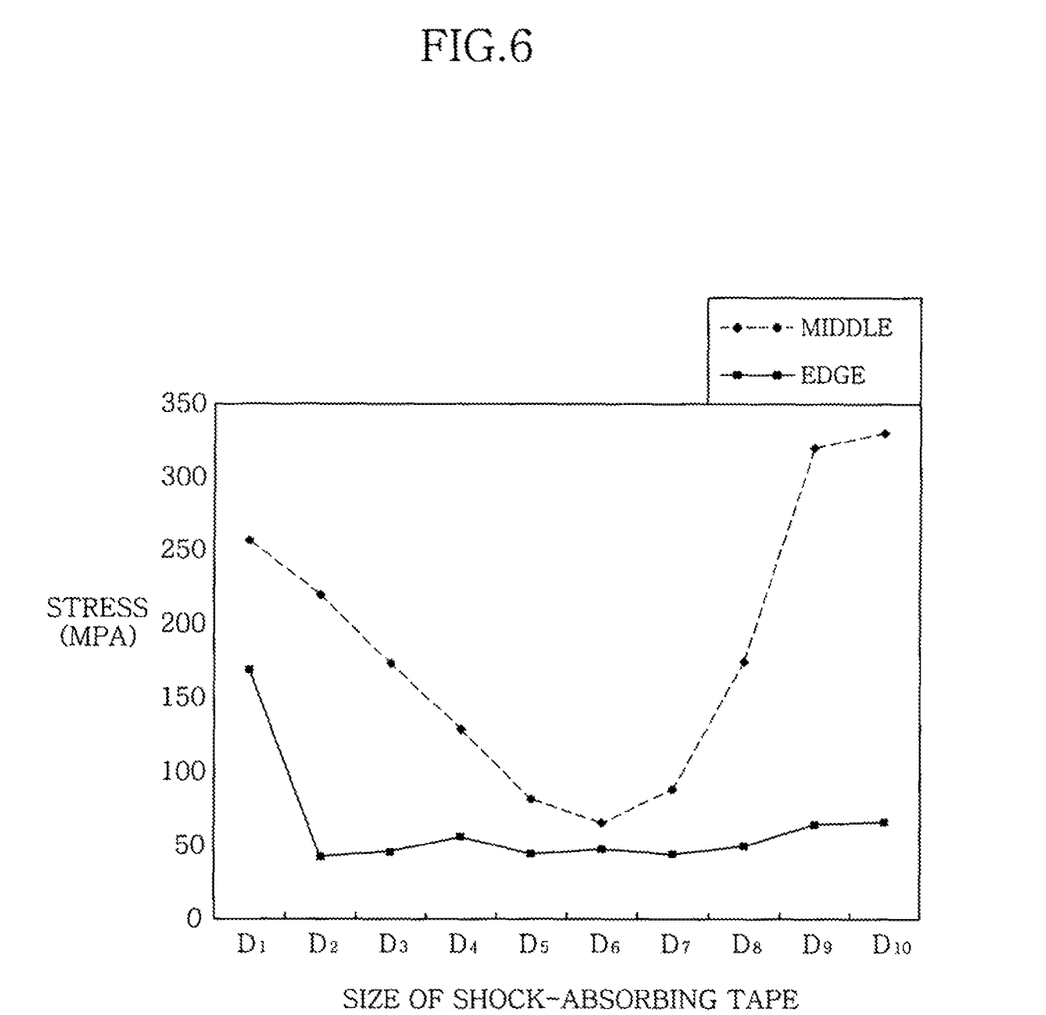
FIG. 6 is a graph showing stresses in a middle of and at an edge of the display panel according to a size of a shock-absorbing tape measured on a lower surface of the second substrate of the display panel.

FIGS. 3 to 6 are graphs showing stresses according to a size of the shock-absorbing tape 300 measured in a middle and at an edge of the display panel 100. Specifically, stress measured on an upper surface of the first substrate 100 is shown in FIG. 3, stress measured on a lower surface of the first substrate 110 is shown in FIG. 4, stress measured on an upper surface of the second substrate 120 is shown in FIG. 5, and stress measured on a lower surface of the second substrate 120 is shown in FIG. 6.

Here, the size of the shock-absorbing tape 300 is controlled by reducing a length d of the shock-absorbing tape 300 by ⅙ of a length p of the pad part A of the display panel 100 in a length direction of the display panel 100. That is, D1 denotes a size of the shock-absorbing tape 300 in contact with the display part B and the entire pad part A of the display panel 100, D2 denotes a size of the shock-absorbing tape 300 in contact with the display part B and ⅚ of the pad part A of the display panel 100, D3 denotes a size of the shock-absorbing tape 300 in contact with the display part B and ⅔ of the pad part A of the display panel 100, D4 denotes a size of the shock-absorbing tape 300 in contact with the display part B and ½ of the pad part A of the display panel 100, D5 denotes a size of the shock-absorbing tape 300 in contact with the display part B and ⅓ of the pad part A of the display panel 100, D6 denotes a size of the shock-absorbing tape 300 in contact with the display part B and ⅙ of the pad part A of the display panel 100, D7 denotes a size of the shock-absorbing tape 300 in contact with the display part B and none of the pad part A of the display panel 100, D8 denotes a size of the shock-bsorbing tape 300 in contact with the display part B reduced by ⅙ of the pad part A of the display panel 100, D9 denotes a size of the shock-absorbing tape 300 in contact with the display part B reduced by ⅓ of the pad part A of the display panel 100, and D10 denotes a size of the shock-absorbing tape 300 in contact with the display part B reduced by ½ of the pad part A of the display panel 100.

Referring to FIGS. 3 to 6, when the shock-absorbing tape 300 is in contact with the display part B and ⅓ to ⅚ of the pad part A of the display panel 100, a lower stress is transferred than when the shock-absorbing tape 300 is in contact with the display part B and the entire pad part A of the display panel 100.

Accordingly, in the flat panel display device according to aspects of the present invention, the shock-absorbing tape 300 disposed between the display panel 100 and the supporting member 200 is in contact with the display part B and between ⅓ and ⅚ of the pad part A of the display panel 100, thereby minimizing the shock transferred from the supporting member 300.

Figure 7:
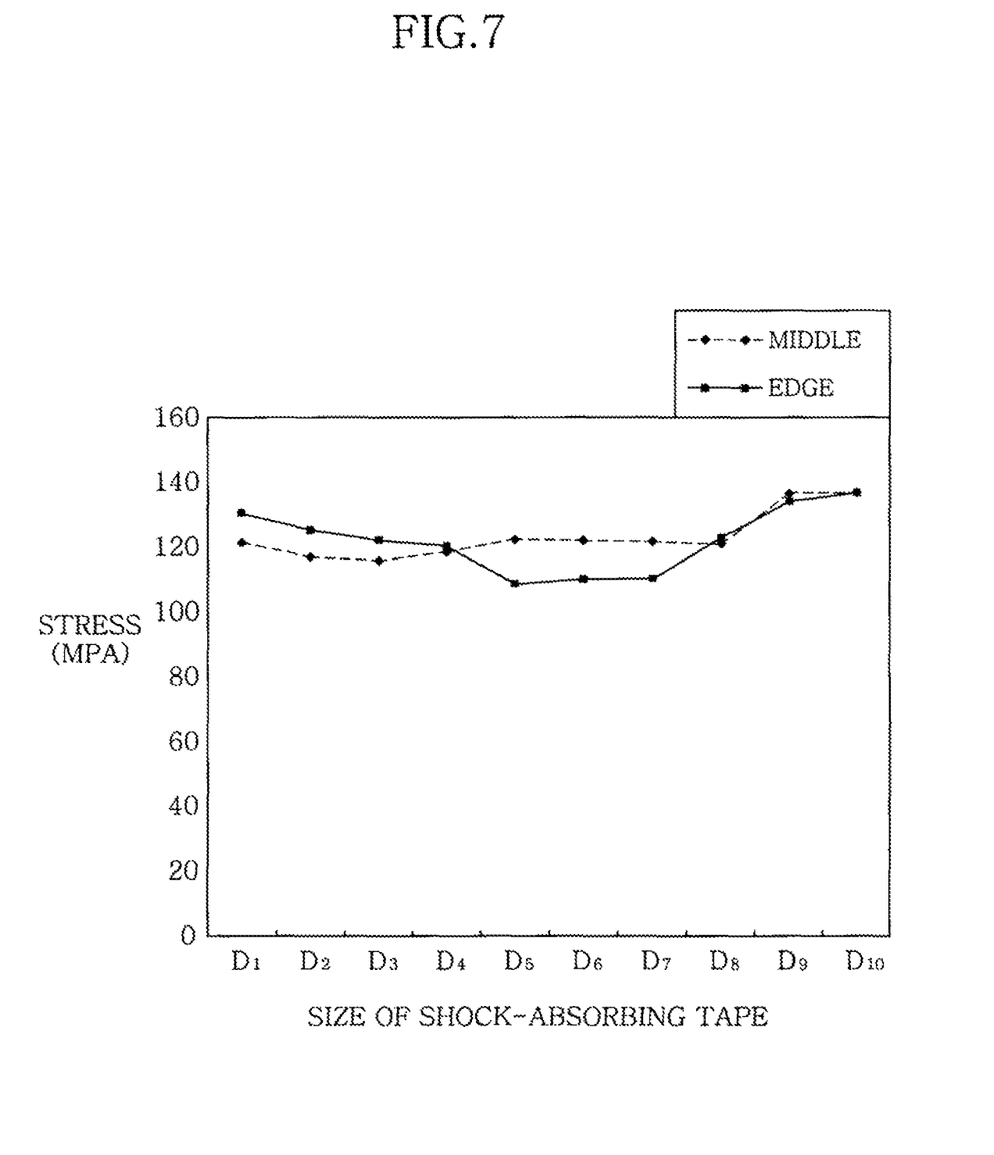
FIG. 7 is a graph showing stresses in a middle of and at an edge of a touch panel according to a size of a shock-absorbing tape measured on an upper surface of a substrate toward a display panel of the touch panel.
Figure 8:
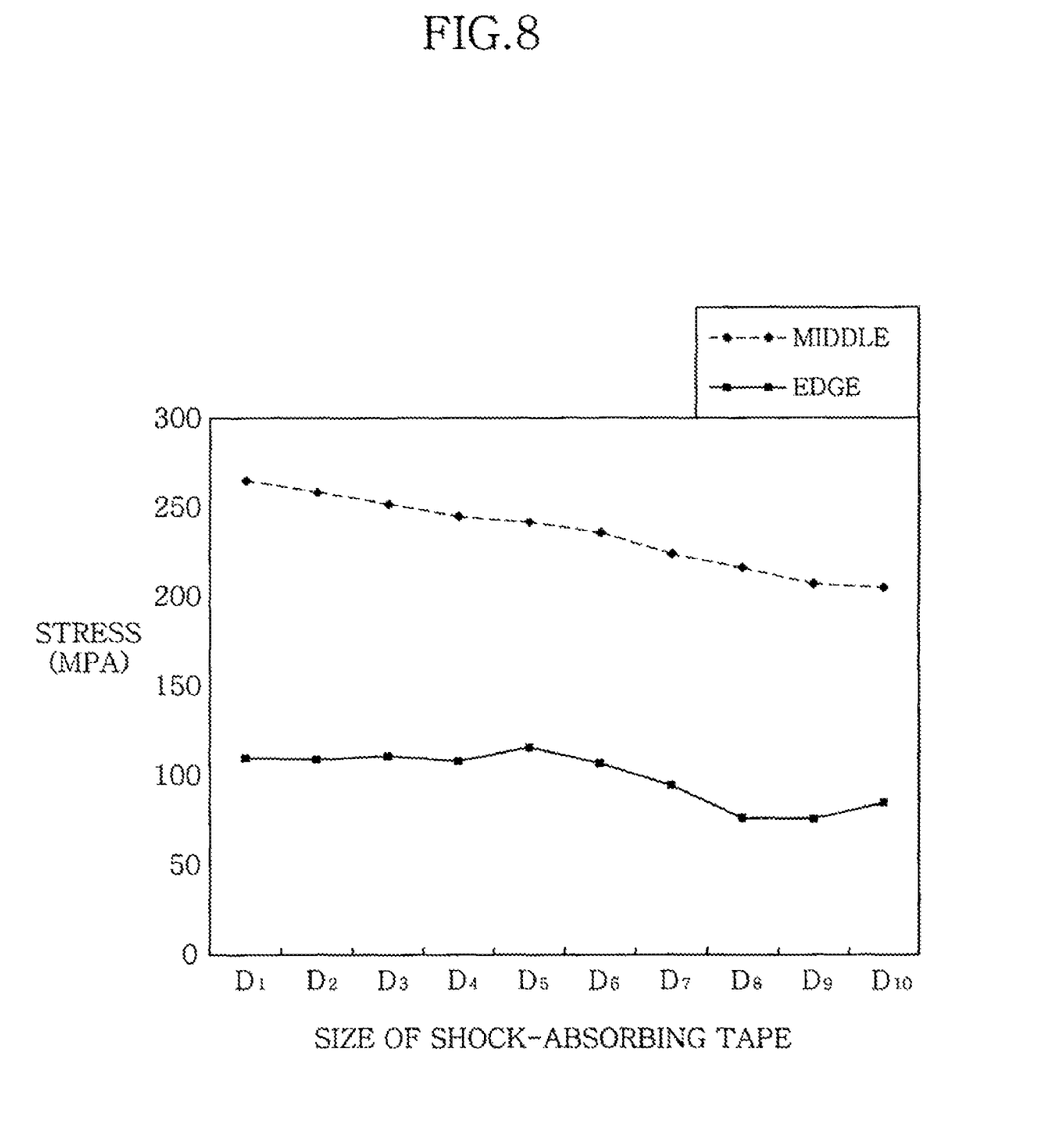
FIG. 8 is a graph showing stresses in the middle of and at the edge of the touch panel according to a size of a shock-absorbing tape measured on a lower surface of a substrate toward the display panel of the touch panel.

FIGS. 7 and 8 are graphs showing stresses according to the size of the shock-absorbing tape 300 measured in the middle and at an edge of the touch panel 400 when the flat panel display device according to aspects of the present invention includes the touch panel 400. Specifically, stress measured on an upper surface of a substrate toward the display panel 100 of the touch panel 400 is shown in FIG. 7, and stress measured on a lower surface of the substrate toward the display panel 100 of the touch panel 400 is shown in FIG. 8.

Referring to FIG. 7, on the upper surface of the substrate toward the display panel 100 of the touch panel 400, the stress decreases while the size of the shock-absorbing tape 300 decreases, until a portion of the display part B of the display panel 100 is exposed (i.e., not covered with the shock-absorbing tape 300). When a portion of the display part B is exposed, the stress increases. Referring to FIG. 8, on the lower surface of the substrate toward the display panel 100 of the touch panel 400, the stress decreases while the size of the shock-absorbing tape 300 decreases. Thus, when the shock-absorbing tape 300 is in contact with all of the display part B and up to ⅚ of the pad part A of the display panel 100, a lower stress is transferred than when the shock-absorbing tape 300 is in contact with the display part B and the entire pad part A of the display panel 100.

Accordingly, when the shock-absorbing tape 300 disposed between the display panel 100 and the supporting member 200 is in contact with the display part B and ⅓ to ⅚ of the pad part A of the display panel 100, a shock transferred to the display panel 100 from the supporting member 300 may be minimized even if the touch panel 400 is disposed on one side of the display panel 100.

As a result, the drop characteristics of the flat panel display device according to an embodiment of the present invention is optimized by providing the shock-absorbing tape 300 disposed between the display panel 100 and the supporting member 200 to contact the display part B and ⅓ to ⅚ of the pad part A of the display panel 100.

According to aspects of the present invention, a size of a shock-absorbing tape disposed between a display panel and a supporting member is controlled to be in contact with a display part and ⅓ to ⅚ of a pad part of the display panel, thereby minimizing a drop characteristic of a flat panel display device. Thus, a stress transferred to the display panel of the flat panel display device due to an external shock (such as from being dropped) is minimized.

It is to be understood that where is stated herein that one unit is "disposed on" a second unit, the first unit may be disposed directly on the second unit or there may be intervening units between the first unit and the second unit.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A flat panel display device, comprising:
    a display panel having a display part to display an image and a pad part that does not display the image;
    a supporting member to support the display panel; and
    a shock-absorbing tape disposed between the display panel and the supporting member, the shock-absorbing tape being in contact with the display part of the display panel and ⅓ to ⅚ of the pad part of the display panel.

2. The device as claimed in claim 1, wherein the display panel comprises a first substrate and a second substrate having a smaller area than the first substrate, and the shock-absorbing tape is disposed between the first substrate and the supporting member.

3. The device as claimed in claim 2, further comprising:
    a polarizer disposed on the second substrate of the display panel.

4. The device as claimed in claim 2, further comprising:
    a touch panel disposed on the second substrate of the display panel.

5. The device as claimed in claim 1, wherein the supporting member is formed of a metal or synthetic resin.

6. The device as claimed in claim 1, wherein the shock-absorbing tape is a double-sided tape.

7. The device as claimed in claim 1, wherein the shock-absorbing tape is an insulating tape.

8. The device as claimed in claim 1, wherein the shock-absorbing tape is formed of a metal or synthetic resin.

9. The device as claimed in claim 2, wherein the display part of the display panel is an area in which the first substrate and the second substrate overlap.

10. The device as claimed in claim 2, further comprising:
    a polarizer disposed on the second substrate of the display panel;
    a touch panel to receive an input signal; and
    an ESP tape disposed between the touch panel and the polarizer.

11. The device as claimed in claim 1, further comprising:
    a driving driver provided on the pad part to convert a received image signal into an image signal displayable by the display part as the image.

12. A flat panel display device, comprising:
    a display panel having a display part to display an image and a pad part that does not display the image;
    a supporting member to support the display panel;
    a touch panel to receive an input signal; and
    a shock-absorbing tape disposed between the display panel and the supporting member, the shock-absorbing tape being in contact with all of the display part of the display panel and up to ⅚ of the pad part of the display panel.

13. The device as claimed in claim 12, wherein the display panel comprises a first substrate and a second substrate having a smaller area than the first substrate, and the shock-absorbing tape is disposed between the first substrate and the supporting member.

14. The device as claimed in claim 13, further comprising:
    a polarizer disposed on the second substrate of the display panel.

15. The device as claimed in claim 12, wherein the supporting member is formed of a metal or synthetic resin.

16. The device as claimed in claim 12, wherein the shock-absorbing tape is a double-sided tape.

17. The device as claimed in claim 13, wherein the display part of the display panel is an area in which the first substrate and the second substrate overlap.

18. A flat panel display device, comprising:
    a display panel having a display part to display an image and a pad part that does not display the image;
    a supporting member to support the display panel; and
    a shock-absorbing tape disposed between the display panel and the supporting member, the shock-absorbing tape being in contact with all of the display part of the display panel.

19. The device as claimed in claim 18, wherein the shock-absorbing tape is in contact with all of the display part and ⅓ to ⅚ of the pad part of the display panel.

20. The device as claimed in claim 18, further comprising:
    a touch panel to receive an input signal,
    wherein the shock-absorbing tape is in contact with up to ⅚ of the pad part of the display panel.

* * * * *